Patented May 31, 1932

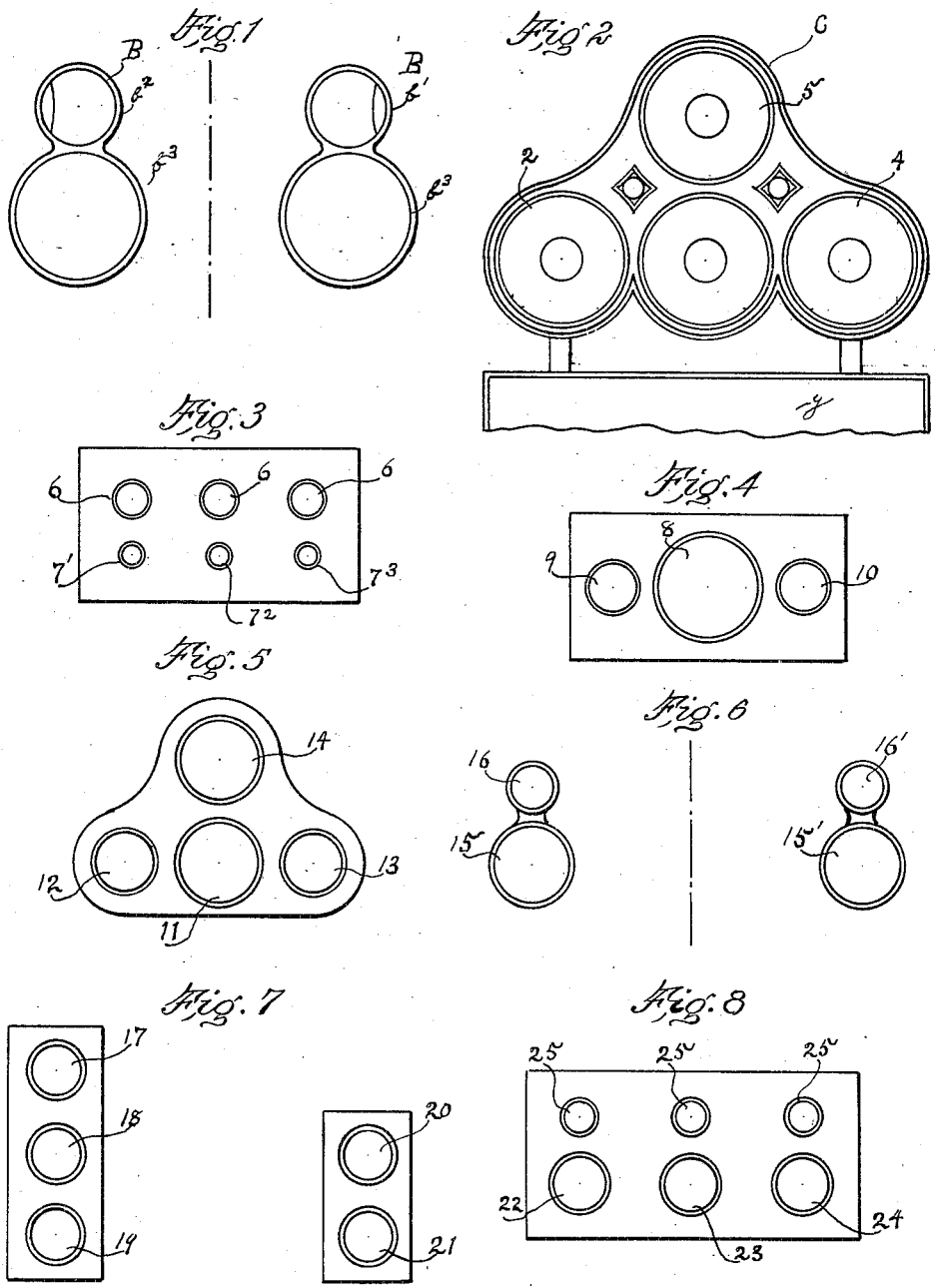

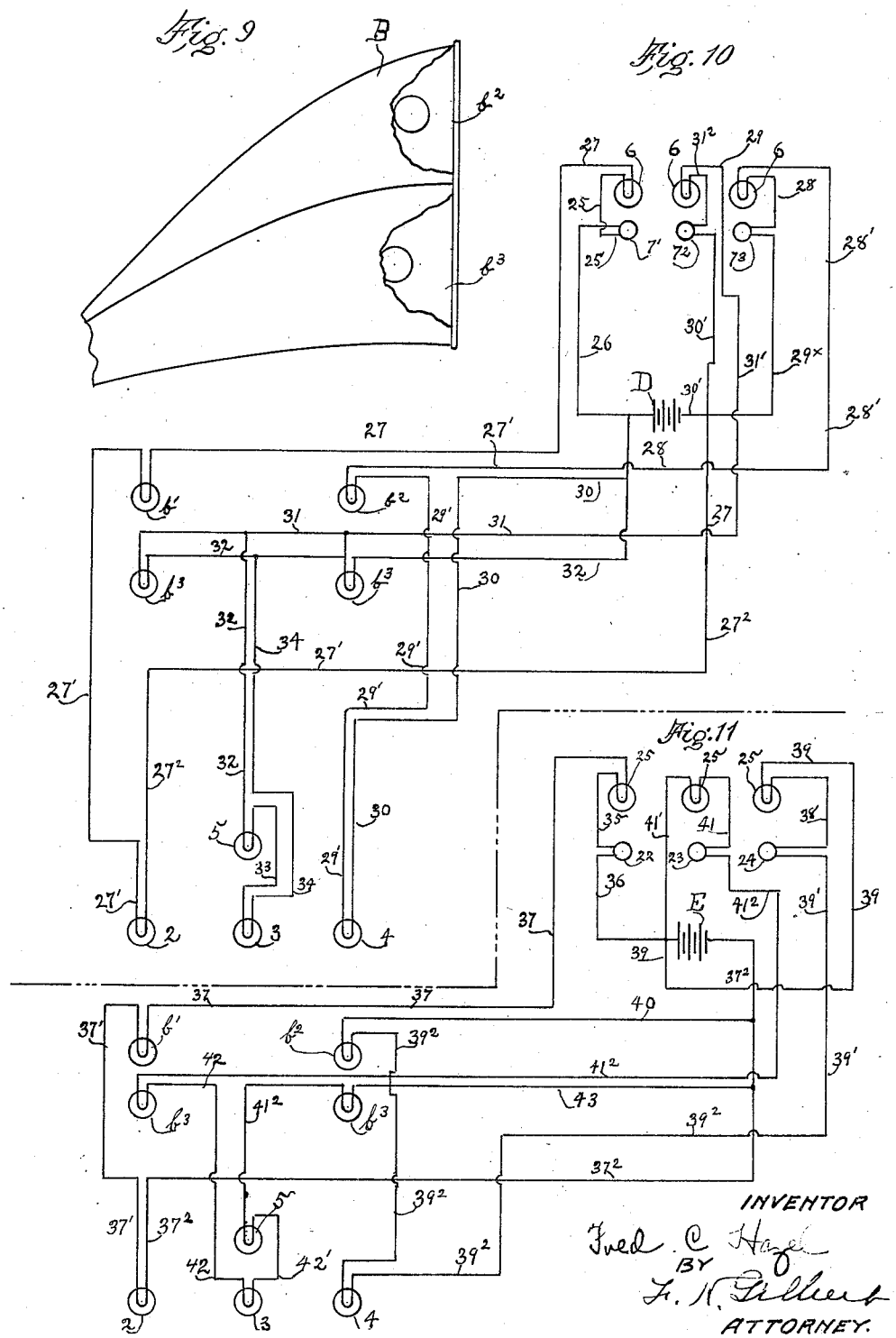

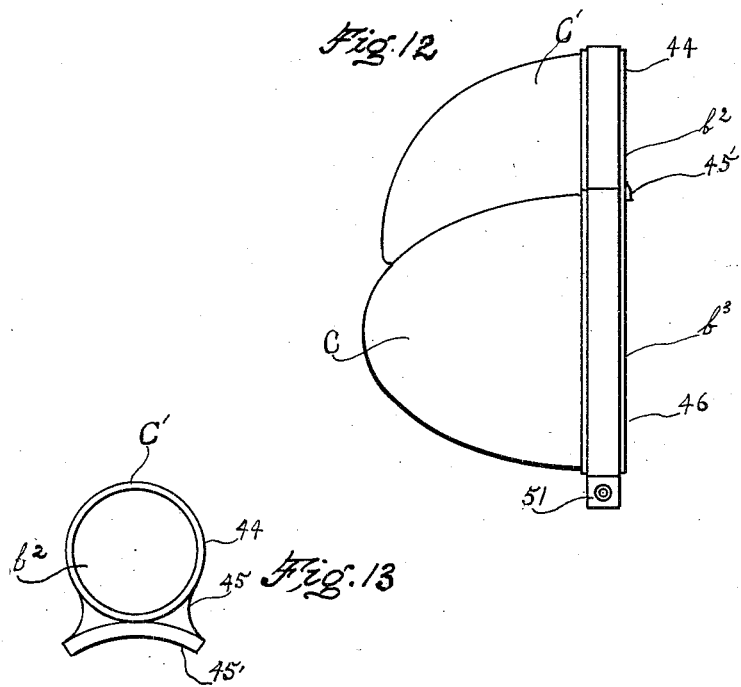
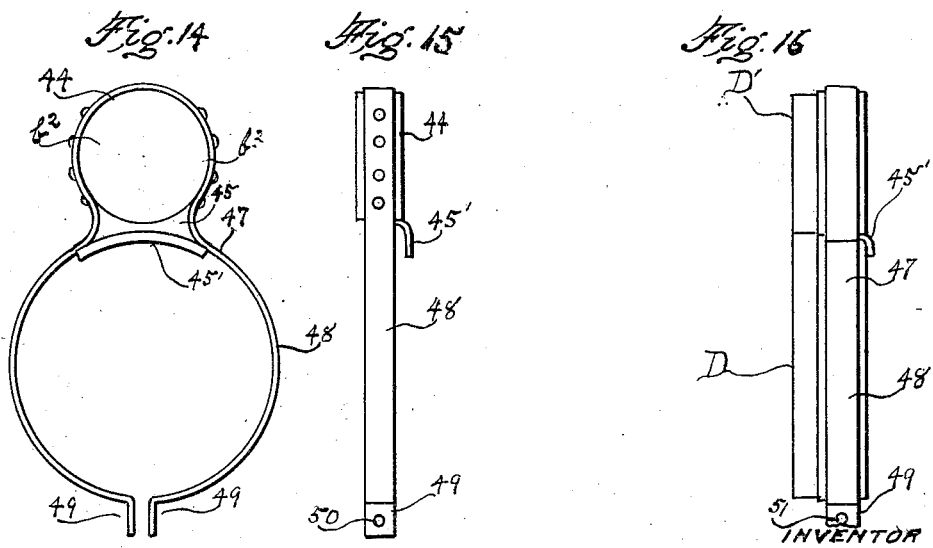

1,860,416

UNITED STATES PATENT OFFICE

FRED C. HAZEL, OF BINGHAMTON, NEW YORK

AUTOMOBILE AND MOTOR CYCLE SIGNAL LIGHT

Application filed August 20, 1926. Serial No. 130,446.

My invention relates to improvements in automobile and motor cycle signal lights and it has for its object to provide a simple, effective and artistic system of signal lights for automobiles and motor cycles, whereby a signal may be given at night as to the direction of the automobile when it is about to turn or when it is about to stop.

With these and other objects in view, my invention consists in the following novel arrangements of parts as are more clearly described and hereinafter pointed out in the claims, reference being had to the accompanying drawings, in which:

Fig. 1 is a front view of my device as an automobile signal head light.

Fig. 2 is a front view of my device as applied to the rear signal lights.

Fig. 3 is a front elevation of the switch box on my device.

Fig. 4 is a front view of my device as applied to the head lights of a motor cycle.

Fig. 5 is a rear view of my device as applied to a motor cycle with the side car.

Fig. 6 is a front view of my device as applied to a motor cycle with a side car.

Fig. 7 is a front view of my device as applied to the rear lights of a motor cycle signal to a side car.

Fig. 8 is a front view of an illuminated signal box, as applied to my device.

Fig. 9 is a side view of a fragmentary part of my device.

Fig. 10 is a plan view of the wiring features of a part of my device.

Fig. 11 is a plan view of the wiring features of part of my device.

Fig. 12 is a side view of a modified form of my device.

Fig. 13 is a front view of a part of a modified form of my device.

Fig. 14 is a front view of a part of a modified form of my device.

Fig. 15 is a side view of a modified form of my device, as shown in Figure 13.

Fig. 16 is a side view of a modified form of my device.

The same reference characters denote like parts in each of the several figures of the drawings.

In carrying out my invention, I provide for the head lights of the automobile, combination lenses on each side of the automobile indicated by the letters B, B, the upper lenses B' and B², in this group being red lenses and the lower lenses B³ and B³ the ordinary automobile head lights; the upper lenses may be mounted in a frame forming an integral part of the frame, which holds the lower lens; or the upper lens may be mounted in a frame which is adjustably and removably mounted upon the lower lens frame in any convenient manner; and connected with these lenses, I have any convenient wiring system for the purpose of manipulating the lights behind the lenses. As a further part of my invention I provide in the rear of the automobile a group of lenses C and this group is formed of lenses 2, 3, 4 and 5, the central lens 3 being the normal tail light lens, while the lenses 2 and 4 white, showing right and left movements of auto and 5 red, being the stop light, operated from the brake and connected with each lens an appropriate wire system, connected with the switch box of the automobile for manipulating the lights behind the lenses. Below the group is suspended the automobile license plate Y. As a further part of my device I provide a switch box, as shown in Fig. 3, having therein the red lenses 6, 6, 6 and push buttons 7', 7², 7³, the button 7¹ operating light B¹ front and 2 in rear; button 7² operating light B² in front and light 4 in rear; button 7³ operating ordinary head and tail lights, being 3 in rear and B³, B³ in front, and with appropriate electrical wiring for manipulating in combined movement, the signals for signaling a left turn B¹ and 2 or a right turn B² and 4 in combination with the rear lights. As a further part of my device and as applied to a motor cycle without a side car, I provide a combination as shown in Fig. 4; the signal lenses 8, showing the white head light, while the side lenses 9 and 10 show a red light, indicating right and left turns. As a further part of my device, I show a grouping of rear lights for a motor cycle without side car. The lens 11 being the usual red tail light, while lenses 12 and 13 are white, showing right and left turns and 14 shows a red stop light, working from the brake. As a further part of my invention, as applied to a motor cycle with a side car, I provide a combination shown in Fig. 6 for head lights, front light with lenses 15 and 16 and 15' and 16'. Lenses 15 and 15' being white head lights and lenses 16 and 16' being red head lights, for indicating right and left turn, one group mounted on the motor cycle and the other group mounted on the side car. As a further part of my invention for motor cycles with side car, I provide a combination shown in Fig. 7 for rear lights of the motor cycle, the lights 17, 18 and 19, the central light 18 being a red tail light and the upper lens 17, white light, indicating left turn and lower lens 19 being red light, indicating stop, working from the brake and for the side car I provide the lenses 20 and 21, the light 20 being a white light, indicating right turn and the light 21 being a red light, ordinary tail light for side car. As a further part of my device, I provide a switch box having the push buttons 22, 23 and 24 and over each, the tell-tale light 25, 25, 25, to indicate that the signal lights are in working operation; 22 indicating the lights on a turn to the left and 24 indicating the lights on a turn to the right, and 23 indicating the head and tail light on motor cycle and side car, each working operation being indicated by the flash of the upper light.

It is to be understood that in carrying out my invention, the wiring systems are so constructed as to make the operation of the varied lights in connection with the push buttons of the signal box, operative and practical and mounted in any convenient manner, connected with the battery.

In the wiring plan of my device I provide the following system or plan, as shown in Fig. 10. From push button 7' I have the wire 25, connecting with light 6, also from 7', I have the wire 26 extending to the battery D. From light 6, I have the wire 27 extending to light B'; from light B', I have the wire 27', extending and connecting with rear light 2 and from rear light 2 I have the wire 27², which connects with battery D; from push button 7³, I have the wire 28 connecting with light 6 and from light 6, I have the wire 28' connecting with B² and from push button 3, I have the wire 29ˣ connecting with battery D: From light B², I have the wire 29' which extends to rear light 4 and from rear light 4, I have the wire 30 which extends to wire 28 and thence to battery D: From push button 7², I have the wire 30 connecting with light 6 and from 7² I have the wire 30', connecting with battery D and from light 6 I have the wire 29 or 31 extending to light b³ and from light b³ I have the wire 32, connecting with wire 27' and thence back to battery D and from wire 31 I have wire 32 extending to light 5 and from light 5, I have wire 33 extending to light 3 and from light 3, I have wire 34 extending to wire 32, thence to wire 27' and back to battery D.

As a further part of my device as showing the wiring plan for the tell-tale to determine the operation of the lights, I have the buttons 22, 23 and 24 and the lights 25, 25, 25; from button 22 I have the wire 35 connecting with the light 25 and from light 25 I have the wire 37 extending to light B', from light B' I have the wire 37' extending to rear light 2 and from rear light 2 I have the wire 37² extending to battery E; from light 25, I have the wire 36 extending to battery E; from button 24 I have the wire 38 extending to light 25; from light 25 I have the wire 39 extending and connecting with battery E; from button 24 I have the wire 39' extending to light 4; from light 4, I have the wire 39² extending to light B² and from light B² I have the wire 40 connecting with 37² and thence to battery E; from central button 23, I have the wire 41 connecting with central light 25 and from light 25, I have the wire 41' connecting with battery E; from button 23, I have the wire 41² extending to light B³ and from light B³, I have the wire 42 extending to rear light 3 and from rear light 3, I have the wire 42' extending to light 5 and from rear light 5, I have the wire 41², extending to light B³ and from the light B³, I have the wire 43, extending again to the battery E, which completes the circuit wiring of the system.

In a modified form of my device, I have the headlight body C, shown in Fig. 12 and removably mounted on the body C, I have the signal light body C'. The body C' has about its front edge, the rim 44 and beneath the rim 44 and integral therewith or mounted upon the same in any convenient manner, I have the curved support 45, having the over-lapping curved edge 45', adapted to be mounted upon the rim 46 of headlight body C. The face of the signal light body C', I designate by b² and the face of the headlight body I designate by the letters b³. Mounted in any convenient manner on the rim 44 of the body C', I have the metal hand 47 which may be fastened about the outer surface of the front end of the body C' or about the rim 44 of the same, in any convenient manner such as by rivets or otherwise. The ends of the band 47 project downward in the curved formations 48 and terminate in the lug projectings 49 thru which I have the nut bolt openings 50, adapted to removably mount therein a nut bolt 51 or any means for fastening the same together. In a further modified form of my device I have the headlight body D and removably mounted thereon I have the signal light body D' removably mounted on the body D. The band 47 and its curved formation 48 together with the lugs 49 and the bolt nut 50 mounted therein, holds securely the body D' mounted upon the body D as before described.

In a further modified form of my device, as shown, I have the head lights of the automobile, the combination lenses represented by the letters B and B', as shown in the wiring diagram, represented in Figure 17, in which Fig. 17, I have the battery represented by E, and in this wiring diagram the direction lights are shown in Figs. 1 and 2, which in normal condition are for the purpose of showing in the front the right and left turn to be made, and in the rear, I have the lights as in Fig. 2, the said lights 2 and 4, which in normal condition show or indicate the right and left turns in the rear of the car.

Having thus described my invention what I claim as new and for which I desire Letters Patent is as follows:

An automobile direction signal comprising a lamp casing adapted to repose upon the head lamp of a vehicle, a supporting wall depending from said casing and having its opposed side edges curved inwardly, and its lower edge curved to conform to the curvature of the head lamp casing, an outwardly projecting depending flange forming part of said wall and arranged to engage the front of the head lamp to assist in supporting the signal lamp thereon, and a split clamping band including superimposed annular clamping portions of relatively different dimensions, the upper clamping portion embracing the signal lamp casing and received by the curved edges of said wall, the lower portion embracing the head lamp, and means for connecting the ends of the band together.

In testimony whereof I have affixed my signature.

FRED C. HAZEL.